(12) United States Patent
Zhou et al.

(10) Patent No.: US 10,572,986 B2
(45) Date of Patent: Feb. 25, 2020

(54) IMAGE ENHANCEMENT METHOD AND DEVICE

(71) Applicants: BOE Technology Group Co., Ltd., Beijing (CN); Beijing BOE Display Technology Co., Ltd., Beijing (CN)

(72) Inventors: Chengqi Zhou, Beijing (CN); Jun Guo, Beijing (CN); Xin Duan, Beijing (CN); Xiaomang Zhang, Beijing (CN); Jieqiong Wang, Beijing (CN); Ming Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 85 days.

(21) Appl. No.: 16/014,429

(22) Filed: Jun. 21, 2018

(65) Prior Publication Data

US 2019/0206034 A1 Jul. 4, 2019

(30) Foreign Application Priority Data

Jan. 4, 2018 (CN) .......................... 2018 1 0008476

(51) Int. Cl.
| | |
|---|---|
| *G06T 5/20* | (2006.01) |
| *G06K 9/38* | (2006.01) |
| *G06F 17/16* | (2006.01) |
| *G06F 17/18* | (2006.01) |
| *G06T 5/00* | (2006.01) |

(52) U.S. Cl.
CPC ................ *G06T 5/20* (2013.01); *G06F 17/16* (2013.01); *G06F 17/18* (2013.01); *G06K 9/38* (2013.01); *G06T 5/008* (2013.01); *G06T 2207/10024* (2013.01)

(58) Field of Classification Search
CPC . G06T 5/20; G06T 5/008; G06T 2207/10024; G06F 17/16; G06F 17/18; G06K 9/38
See application file for complete search history.

(56) References Cited

U.S. PATENT DOCUMENTS

| | | | | |
|---|---|---|---|---|
| 6,885,482 | B1 * | 4/2005 | Kubo | ........................ G06T 5/20 358/518 |
| 9,621,767 | B1 * | 4/2017 | El Mezeni | ........... H04N 19/186 |
| 2005/0013506 | A1 * | 1/2005 | Yano | ....................... G06T 5/009 382/274 |
| 2006/0078222 | A1 * | 4/2006 | Hwang | ................... G06T 5/008 382/274 |
| 2010/0195901 | A1 * | 8/2010 | Andrus | ................. H04N 5/213 382/162 |

\* cited by examiner

*Primary Examiner* — David F Dunphy
(74) *Attorney, Agent, or Firm* — Westman, Champlin & Koehler, P.A.

(57) ABSTRACT

The present disclosure discloses an image enhancement method and device. The method comprises: performing logarithm related processing on a grayscale value matrix Y of an original image to obtain a logarithmic matrix L_LOG; quantizing the logarithmic matrix L_LOG to obtain a quantized matrix Y_RE; and obtaining an enhanced image of the original image according to the quantized matrix Y_RE, wherein quantizing the logarithmic matrix L_LOG comprises: when the logarithmic matrix L_LOG is quantized to be within a grayscale range of a certain depth, causing a zero point of the logarithmic matrix L_LOG to be close to an average value of the grayscale value matrix Y.

12 Claims, 3 Drawing Sheets

IMAGE ENHANCEMENT METHOD AND DEVICE

CROSS-REFERENCE TO RELATED APPLICATION(S)

This application claims priority to the Chinese Patent Application No. 201810008476.8, filed on Jan. 4, 2018, which is incorporated herein by reference in its entirety.

TECHNICAL FIELD

The present disclosure relates to the technical field of image processing, and more particularly, to an image enhancement method and device.

BACKGROUND

The RETINEX (Retina and Cerebral Cortex) algorithm is a commonly used image enhancement method which is developed based on scientific experiments and scientific analysis, and its theoretical basis is that a color of an object is decided by reflectivity of the object relative to light of a long wave (red), a medium wave (green), and a short wave (blue), instead of being decided by an absolute value of intensity of reflected light. The color of the object is not affected by non-uniformity of the light, and has consistency, that is, RETINEX is based on the color sensation consistency (color constancy). Compared with the linear and non-linear methods in the related art that only a certain type of features of an image can be enhanced, RETINEX can achieve balance among three aspects of dynamic range compression, edge enhancement, and color constancy, and therefore can adaptively enhance various types of images.

In practical applications, severe distortion may sometimes occur in the enhanced image obtained by the RETINEX algorithm in the related art.

SUMMARY

An aspect of the present disclosure provides an image enhancement method, comprising:

performing logarithm related processing on a grayscale value matrix Y of an original image to obtain a logarithmic matrix L_LOG;

quantizing the logarithmic matrix L_LOG to obtain a quantized matrix Y_RE; and obtaining an enhanced image of the original image according to the quantized matrix Y_RE, wherein quantizing the logarithmic matrix L_LOG comprises: when the logarithmic matrix L_LOG is quantized to be within a grayscale range of a certain depth, causing a zero point of the logarithmic matrix L_LOG to be close to an average value of the grayscale value matrix Y.

In an embodiment, quantizing the logarithmic matrix L_LOG to be within a grayscale range of a certain depth comprises:

corresponding a range from a maximum value to a minimum value of the logarithmic matrix L_LOG to the depth of the grayscale range.

In an embodiment, the logarithmic matrix L_LOG is quantized to be within a grayscale range of a certain depth according to the following equation:

$$Y\_RE(x, y) = \begin{cases} \frac{DEPTH - Y\_ave}{LOG\_MAX} \times L\_LOG(x, y) + Y\_ave, & L\_LOG \geq 0 \\ \frac{LOG\_MIN - L\_LOG(x, y)}{LOG\_MIN} \times Y\_ave, & L\_LOG < 0 \end{cases}$$

wherein L_LOG(x,y) represents a logarithmic value of a grayscale of a pixel (x,y) of the original image in the logarithmic matrix L_LOG, Y_RE(x,y) represents a grayscale value of a grayscale of a pixel (x,y) in the quantized matrix Y_RE, DEPTH represents a depth of the grayscale range, Y_ave is an average value of the grayscale value matrix Y, and LOG_MAX and LOG_MIN represent a maximum value and a minimum value of the logarithmic matrix L_LOG respectively.

In an embodiment, the maximum value and the minimum value of the logarithmic matrix L_LOG are calculated according to an average value and a standard deviation of the logarithmic matrix L_LOG.

In an embodiment, the maximum value and the minimum value of the logarithmic matrix L_LOG are calculated according to the following equation:

LOG_MAX=MEAN+2*STD

LOG_MIN=MEAN−2*STD wherein MEAN and STD are an average value and a standard deviation of the logarithmic matrix L_LOG respectively.

In an embodiment, performing logarithm related processing on a grayscale value matrix Y of an original image comprises:

performing logarithmic transformation on the grayscale value matrix Y to obtain a first logarithmic matrix Y_LOG;

performing logarithmic transformation on the grayscale value matrix Y after performing spatial filtering on the grayscale value matrix Y to obtain a second logarithmic matrix S_LOG; and subtracting the second logarithmic matrix S_LOG from the first logarithmic matrix Y_LOG to obtain the logarithmic matrix L_LOG.

Another aspect of the present disclosure provides an image enhancement device, comprising:

a processor; and a memory connected to the processor, and having instructions stored thereon, which when executed on the processor, causes the processor to be configured to:

perform logarithm related processing on a grayscale value matrix Y of an original image to obtain a logarithmic matrix L_LOG;

quantize the logarithmic matrix L_LOG to obtain a quantized matrix Y_RE; and obtain an enhanced image of the original image according to the quantized matrix Y_RE, wherein the processor is further configured to: when the logarithmic matrix L_LOG is quantized to be within a grayscale range of a certain depth, cause a zero point of the logarithmic matrix L_LOG to be close to an average value of the grayscale value matrix Y.

In an embodiment, the processor is further configured to correspond a range from a maximum value to a minimum value of the logarithmic matrix L_LOG to the depth of the grayscale range when the logarithmic matrix L_LOG is quantized to be within a grayscale range of a certain depth.

In an embodiment, the processor is further configured to quantize the logarithmic matrix L_LOG to be within a grayscale range of a certain depth according to the following equation:

$$Y\_RE(x, y) = \begin{cases} \dfrac{DEPTH - Y\_ave}{LOG\_MAX} \times L\_LOG(x, y) + Y\_ave, & L\_LOG \geq 0 \\ \dfrac{LOG\_MIN - L\_LOG(x, y)}{LOG\_MIN} \times Y\_ave & L\_LOG < 0 \end{cases}$$

wherein L_LOG(x,y) represents a logarithmic value of a grayscale of a pixel (x,y) of the original image in the logarithmic matrix L_LOG, Y_RE(x,y) represents a grayscale value of a grayscale of a pixel (x,y) in the quantized matrix Y_RE, DEPTH represents a depth of the grayscale range, Y_ave is an average value of the grayscale value matrix Y, and LOG_MAX and LOG_MIN represent a maximum value and a minimum value of the logarithmic matrix L_LOG respectively.

In an embodiment, the maximum value and the minimum value of the logarithmic matrix L_LOG are calculated according to an average value and a standard deviation of the logarithmic matrix L_LOG.

In an embodiment, the maximum value and the minimum value of the logarithmic matrix L_LOG are calculated according to the following equation:

LOG_MAX=MEAN+2*STD

LOG_MIN=MEAN-2*STD wherein MEAN and STD are an average value and a standard deviation of the logarithmic matrix L_LOG respectively.

In an embodiment, the processor is further configured to:

perform logarithm related processing on a grayscale value matrix Y of an original image comprises:

perform logarithmic transformation on the grayscale value matrix Y to obtain a first logarithmic matrix Y_LOG;

perform logarithmic transformation on the grayscale value matrix Y after performing spatial filtering on the grayscale value matrix Y to obtain a second logarithmic matrix S_LOG; and subtract the second logarithmic matrix S_LOG from the first logarithmic matrix Y_LOG to obtain the logarithmic matrix L_LOG.

DETAILED DESCRIPTION

Figure 1:
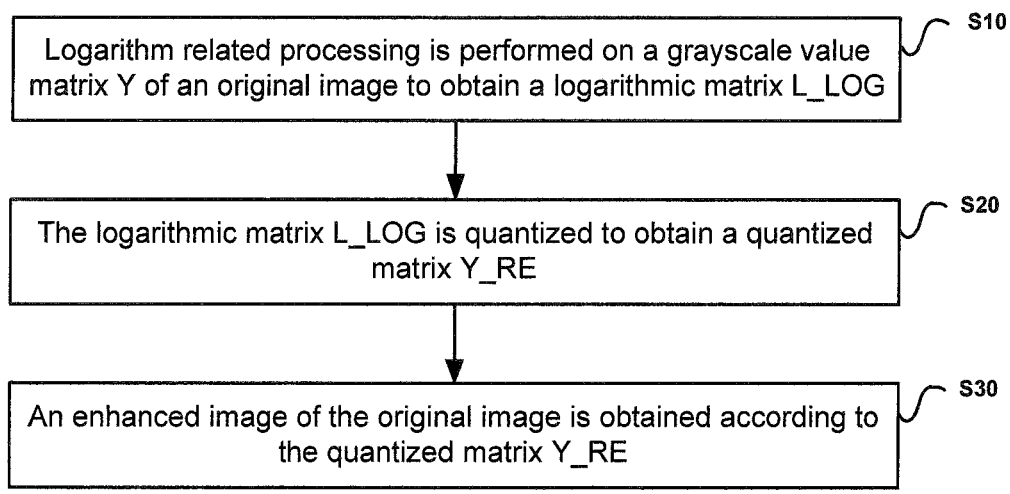
FIG. 1 is a flowchart of an image enhancement method according to an embodiment of the present disclosure.

In order to make the purposes, technical solutions, and advantages of the present disclosure more clear, the present disclosure will be further described in detail below in conjunction with specific embodiments and with reference to the accompanying drawings.

The embodiments of the present disclosure are described in detail below. Examples of the embodiments are illustrated in the accompanying drawings, in which the same or similar reference signs denote the same or similar elements or elements having the same or similar functions throughout. The embodiments described below with reference to the accompanying drawings are exemplary, are used only to explain the present disclosure, and cannot be construed as limiting the present disclosure.

It will be understood by those skilled in the art that the singular forms "a," "an," "the," and "this" used here may also comprise plural forms unless specifically stated. As used here, the phrase "and/or" comprise all or any of one or more of the associated listed items or a combination thereof.

It should be illustrated that all the expressions using "first" and "second" in the embodiments of the present disclosure are used for distinguishing between two different entities or parameters with the same name. Thus, "first" and "second" are used for the convenience of description only, and should not be understood as limitations on the embodiments of the present disclosure, which will not be repeated again in the subsequent embodiments.

It can be seen from the analysis on the RETINEX algorithm in the related art that the reason for the distortion of the enhanced image is that, after image data is processed in a logarithmic domain, the processed data needs to be re-quantized so that the data in the logarithmic domain is re-quantized back to be within a grayscale range of a certain depth, and in this process, if the grayscale is not properly quantized, the resulting enhanced image is likely to be severely distorted. For example, when a larger or smaller value in the logarithmic domain is used as a reference for quantization, as logarithmic values before and after filtering smooth portions of an image have little difference, such smooth portions are all close to a certain grayscale, thereby causing distortion.

Based on the above analysis, when the data in the logarithmic domain is re-quantized back to be within a grayscale range of a certain depth, a zero value of grayscale values in the logarithmic domain is caused to be as close as possible to an average value of grayscales of an original image. Central points of them are aligned with each other, so that the quantification process is stable and balanced, and grayscale values of some portions in the logarithmic domain are prevented from being biased to a certain grayscale, thereby avoiding distortion.

Therefore, in the technical solutions of the present disclosure, a matrix L_LOG is obtained by performing logarithm related processing on a grayscale value matrix Y of an original image; when the matrix L_LOG is quantized to be within a grayscale range of a certain depth, a zero point of L_LOG is caused to be as close as possible to an average value of Y, and a resulting quantized matrix Y_RE is used as a grayscale value matrix of the enhanced image to avoid grayscale values of some portions in the logarithmic region from being close to a certain grayscale, thereby avoiding distortion.

Further, a maximum value and a minimum value of the grayscale values in the logarithmic domain can be calculated, and a range from the maximum value to the minimum value of the grayscale values in the logarithmic domain is corresponded to the depth of the grayscale range on the basis that the zero point of the grayscale values in the logarithmic domain is as close as possible to the average value of the grayscales of the original image, so that grayscale values in the logarithmic region between the maximum value and the minimum value can relatively uniformly correspond to various grayscales, further avoiding a condition that a majority of the grayscale values in the logarithmic domain are close to a certain grayscale which causes distortion.

The technical solutions of the present disclosure will be described in detail below with reference to the accompanying drawings.

A flowchart of an image enhancement method according to an embodiment of the present disclosure, as shown in FIG. 1, comprises the following steps.

In step S10, logarithm related processing is performed on a grayscale value matrix Y of an original image to obtain a logarithmic matrix L_LOG.

In step S20, the logarithmic matrix L_LOG is quantized to obtain a quantized matrix Y_RE.

In step S30, an enhanced image of the original image is obtained according to the quantized matrix Y_RE.

In the present embodiment, quantizing the logarithmic matrix L_LOG comprises: when the logarithmic matrix L_LOG is quantized to be within a grayscale range of a certain depth, causing a zero point of the logarithmic matrix L_LOG to be close to an average value of the grayscale value matrix Y.

Figure 2:
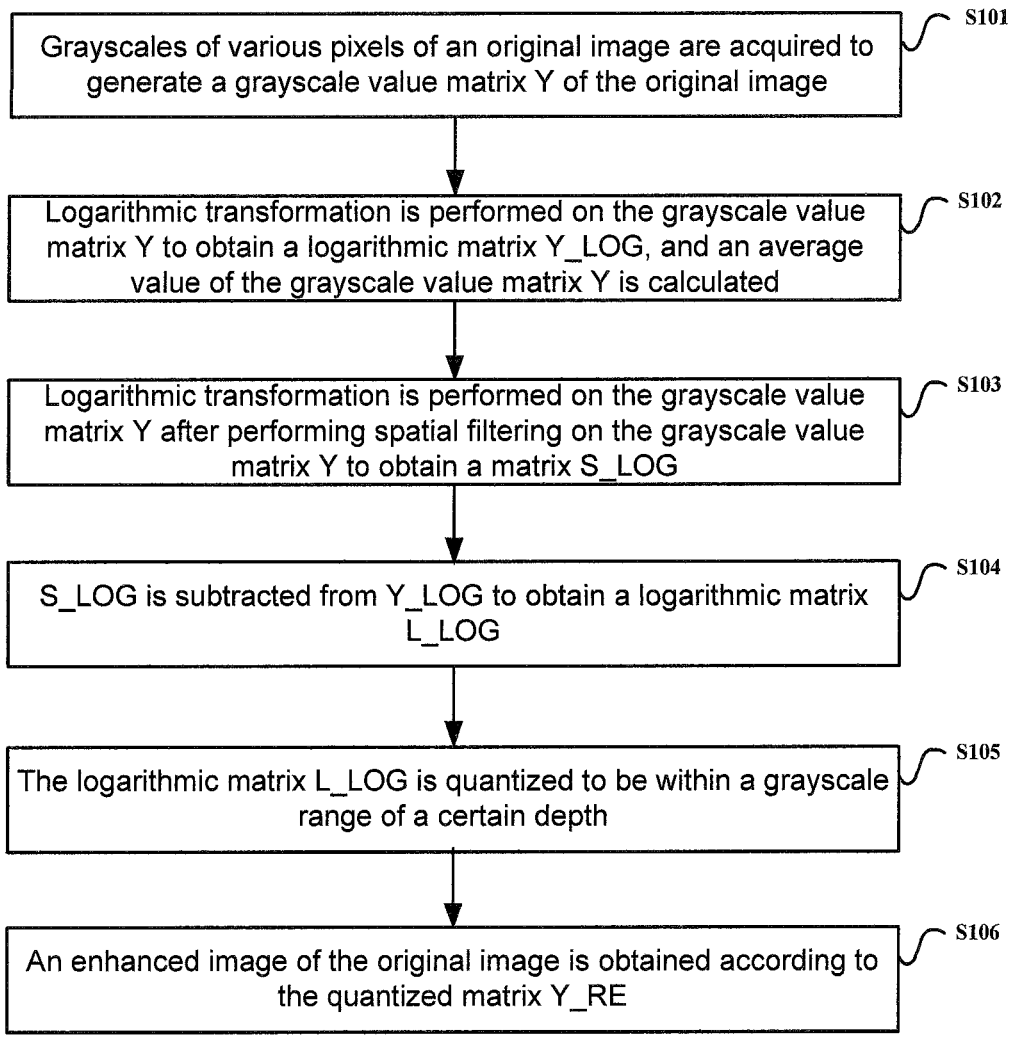
FIG. 2 is a flowchart of an image enhancement method according to another embodiment of the present disclosure.

A specific flow of an image enhancement method according to another embodiment of the present disclosure, as shown in FIG. 2, comprises the following steps.

In step S101, grayscales of various pixels of an original image are acquired to generate a grayscale value matrix Y of the original image.

Specifically, for an original image in YUV (brightness, color, and saturation) format, grayscales of various pixels of the original image are extracted; and a grayscale value matrix Y is composed of grayscale values of various pixels of the original image.

In step S102, logarithmic transformation is performed on the grayscale value matrix Y to obtain a logarithmic matrix Y_LOG, and an average value of the grayscale value matrix Y is calculated.

In this step, logarithmic transformation is performed on the grayscale value matrix Y, i.e., Y_LOG=log(Y); and an average value of the grayscale value matrix Y is calculated to obtain a value Y_ave.

In step S103, logarithmic transformation is performed on the grayscale value matrix Y after performing spatial filtering on the grayscale value matrix Y to obtain a matrix S_LOG.

In this step, a matrix S is obtained by spatial filtering is performed on the grayscale value matrix Y. A specific method for performing spatial filtering on the grayscale value matrix Y may be the same as that for filtering the grayscale value matrix Y in the RETINEX algorithm in the related art. For example, a filtering algorithm such as a convolutional algorithm using a Gaussian kernel is performed on the grayscale value matrix Y, which will not be repeated here.

Further, logarithmic transformation is performed on the matrix S to obtain a logarithmic domain matrix S_LOG, i.e., S_LOG=log(S).

In step S104, S_LOG is subtracted from Y_LOG to obtain a logarithmic matrix L_LOG.

In this step, S_LOG is subtracted from Y_LOG to obtain the logarithmic matrix L_LOG, i.e., $$L\_LOG = Y\_LOG - S\_LOG.$$

In this way, after the calculation of steps S102-S104 described above, the logarithmic matrix L_LOG is obtained by performing logarithm related processing on the grayscale value matrix Y of the original image.

In step S105, the logarithmic matrix L_LOG is quantized to be within a grayscale range of a certain depth.

In this step, the logarithmic matrix L_LOG may be quantized according to the following principle: when the logarithmic matrix L_LOG is quantized to be within a grayscale range of a certain depth, a zero point of the logarithmic matrix L_LOG is caused to be close to an average value of the grayscale value matrix Y. In an embodiment, a range from a maximum value to a minimum value of the logarithmic matrix L_LOG may also be corresponded to the depth of the grayscale range; and the quantized matrix Y_RE is used as a grayscale value matrix of the enhanced image.

Specifically, the logarithmic matrix L_LOG may be quantized to be within a grayscale range of a certain depth according to the following equation 1:

$$Y\_RE(x, y) = \begin{cases} \dfrac{DEPTH - Y\_ave}{LOG\_MAX} \times L\_LOG(x, y) + Y\_ave, & L\_LOG \geq 0 \\ \dfrac{LOG\_MIN - L\_LOG(x, y)}{LOG\_MIN} \times Y\_ave & L\_LOG < 0 \end{cases} \quad \text{(Equation 1)}$$

In the equation 1, L_LOG(x,y) represents a logarithmic value of a grayscale of a pixel (x,y) of the original image in the logarithmic matrix L_LOG, Y_RE(x,y) represents a grayscale value of a grayscale of a pixel (x,y) in the quantized matrix Y_RE, DEPTH represents a grayscale depth, i.e., a depth of the grayscale range, Y_ave is an average value of the grayscale value matrix Y, and LOG_MAX and LOG_MIN represent a maximum value and a minimum value of the logarithmic matrix L_LOG respectively, and may be calculated according to the following equations 2 and 3.

$$LOG\_MAX = MEAN + 2*STD \quad \text{(Equation 2)}$$

$$LOG\_MIN = MEAN - 2*STD \quad \text{(Equation 3)}$$

In the equations 2 and 3, MEAN and STD are an average value and a standard deviation of the logarithmic matrix L_LOG respectively.

When the logarithmic matrix L_LOG is quantized to be within a grayscale range of a certain depth according to the above equation 1, the above principle can be satisfied.

In this way, when the matrix data in the logarithmic domain is re-quantized back to be within a grayscale range of a certain depth, a zero value of grayscale values in the logarithmic domain is caused to be as close as possible to an average value of grayscales of an original image. Central points of the them are aligned with each other, so that the quantification process is stable and balanced, and grayscale values of some portions in the logarithmic domain are prevented from being biased to a certain grayscale, thereby avoiding distortion.

Further, a maximum value and a minimum value of the grayscale values in the logarithmic domain are calculated according to the average value and the standard deviation of the logarithmic matrix L_LOG, and a range from the maximum value to the minimum value of the grayscale values in the logarithmic domain is corresponded to the depth of the grayscale range on the basis that the zero point of the grayscale values in the logarithmic domain is as close as possible to the average value of the grayscales of the original image, so that grayscale values in the logarithmic region between the maximum value and the minimum value can relatively uniformly correspond to various grayscales, further avoiding a condition that a majority of the grayscale values in the logarithmic domain are close to a certain grayscale which causes distortion.

In step S106, an enhanced image of the original image is obtained according to the quantized matrix Y_RE.

In this step, the quantized matrix Y_RE, as a grayscale value matrix of the enhanced image, is remerged with a UV (color and saturation) portion of the original image to obtain the enhanced image.

Figure 3:
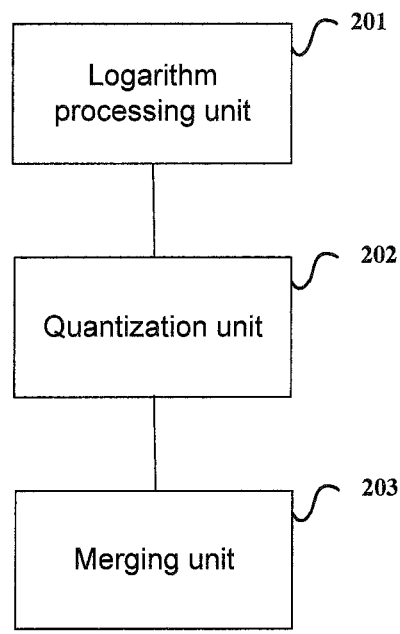
FIG. 3 is an internal structural block diagram of an image enhancement apparatus according to an embodiment of the present disclosure.

Based on the above method, an image enhancement apparatus according to an embodiment of the present disclosure, as shown in FIG. 3, comprises a logarithm processing unit 201, a quantization unit 202, and a merging unit 203.

The logarithm processing unit 201 is configured to perform logarithm related processing on a grayscale value matrix Y of an original image to obtain a logarithmic matrix L_LOG. Specifically, the logarithm processing unit 201 performs logarithmic transformation on Y to obtain a matrix Y_LOG, and calculates an average value of the grayscale value matrix Y; then performs logarithmic transformation on the grayscale value matrix Y after performing spatial filtering on the grayscale value matrix Y to obtain a matrix S_LOG; and then subtracts the matrix S_LOG from the matrix Y_LOG to obtain the logarithmic matrix L_LOG.

The quantization unit 202 is configured to cause a zero point of the logarithmic matrix L_LOG to be close to the average value of the grayscale value matrix Y when the logarithmic matrix L_LOG is quantized to be within a grayscale range of a certain depth.

Further, the quantization unit 202 may further correspond a range from a maximum value to a minimum value of the logarithmic matrix L_LOG to the depth of the grayscale range when the logarithmic matrix L_LOG is quantized to be within the grayscale range of a certain depth.

Specifically, the quantization unit 202 may quantize the logarithmical matrix L_LOG to be within a grayscale range of a certain depth according to the equation 1.

The merging unit 203 is configured to obtain an enhanced image of the original image according to the quantized matrix Y_RE, remerges the quantized matrix Y_RE, as a grayscale value matrix of the enhanced image, with a UV portion of the original image to obtain the enhanced image.

In the technical solutions of the present disclosure, when the data in the logarithmic domain is re-quantized back to be within a grayscale range of a certain depth, a zero value of grayscale values in the logarithmic domain is caused to be as close as possible to an average value of grayscales of an original image. Central points of them are aligned with each other, so that the quantification process is stable and balanced, and grayscale values of some portions in the logarithmic domain are prevented from being biased to a certain grayscale, thereby avoiding distortion.

Further, in the technical solutions of the present disclosure, a maximum value and a minimum value of the grayscale values in the logarithmic domain are calculated according to the average value and the standard deviation of the logarithmic matrix L_LOG, and a range from the maximum value to the minimum value of the grayscale values in the logarithmic domain is corresponded to the depth of the grayscale range on the basis that the zero point of the grayscale values in the logarithmic domain is as close as possible to the average value of the grayscales of the original image, so that grayscale values in the logarithmic region between the maximum value and the minimum value can relatively uniformly correspond to various grayscales, further avoiding a condition that a majority of the grayscale values in the logarithmic domain are close to a certain grayscale which causes distortion.

Figure 4:
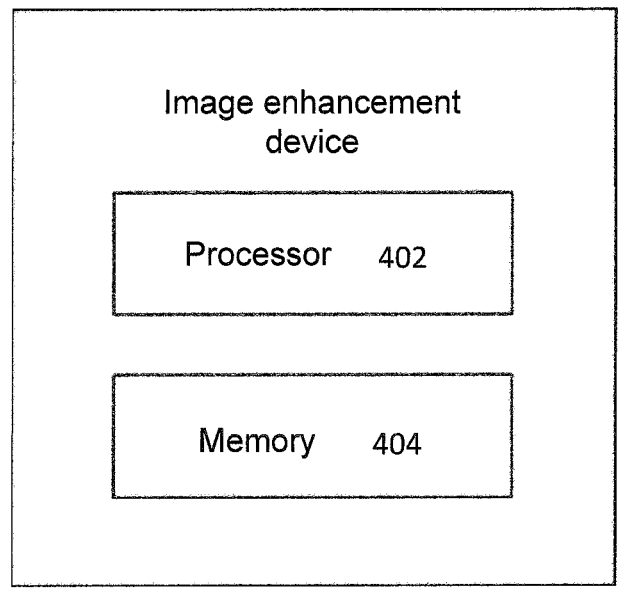
FIG. 4 is a schematic block diagram of an image enhancement device according to an embodiment of the present disclosure.

The embodiments of the present disclosure further provide an image enhancement device. A block diagram of the image enhancement device is shown in FIG. 4, and comprises a processor 402 and a memory 404. It should be illustrated that a structure of the image enhancement device shown in FIG. 4 is only exemplary instead of limiting, and the image enhancement device may further have other components according to practical application requirements.

In the embodiments of the present disclosure, the processor 402 and the memory 404 may communicate with each other directly or indirectly. Components such as the processor 402 and the memory 404 etc. may communicate through a network connection. The network may comprise a wireless network, a wired network, and/or any combination of the wireless network and the wired network. The network may comprise a local area network, the Internet, a telecommunication network, an Internet of Things based on the Internet and/or the telecommunication network, and/or any combination of the above networks etc. For example, the wired network may communicate through a transmission manner such as a twisted pair, a coaxial cable or an optical fiber etc. The wireless network may use a communication manner such as a 3G/4G/5G mobile communication network, Bluetooth, Zigbee or WiFi etc. Types and functions of the network are not limited here in the present disclosure.

The processor 402 may control other components in the image enhancement device to perform desired functions. The processor 402 may be a device having a data processing capability and/or a program execution capability, such as a Central Processing Unit (CPU), a Tensor Processing Unit (TPU) or a Graphics Processing Unit (GPU) etc. The CPU may have X86 or ARM architecture etc. The GPU may be integrated directly onto a motherboard alone or built into a north bridge chip of the motherboard. The GPU may also be built into the CPU as the GPU has a powerful image processing capability.

The memory 404 may comprise any combination of one or more computer program products, which may comprise various forms of computer-readable storage media, such as a volatile memory and/or a non-volatile memory. The volatile memory may comprise, for example, a Random Access Memory (RAM) and/or a cache etc. The non-volatile memory may comprise, for example, a Read Only Memory (ROM), a hard disk, an Erasable Programmable Read Only Memory (EPROM), a portable Compact Disk Read Only Memory (CD-ROM), a USB memory, a flash memory etc.

One or more computer readable codes or instructions may be stored on the memory 404, and the processor 402 may execute the computer instructions to implement the above image enhancement method. With respect to a detailed description of a process flow of the image enhancement method, reference may be made to a description in the embodiments of the present disclosure related to the image enhancement method, and details thereof are not described in detail here again. Various application programs and various data, such as image data sets, and various data (such as training data) used and/or generated by the application programs etc. may also be stored in the computer-readable storage medium.

It can be understood by those skilled in the art that steps, measures, and schemes in various operations, methods and flows which have been discussed in the present disclosure can be alternated, changed, combined, or deleted. Further, other steps, measures, and schemes in various operations, methods, and flows which have been discussed in the present disclosure can also be alternated, changed, rearranged, decomposed, combined, or deleted. Further, steps, measures, and schemes in various operations, methods and flows in the related art which are disclosed in the present disclosure can also be alternated, changed, rearranged, decomposed, combined, or deleted. It should be understood by those of ordinary skill in the art that the discussion of any of the above embodiments is merely exemplary and is not intended to suggest that the scope of the present disclosure (including the claims) is limited to these examples; and according to the idea of the present disclosure, the above embodiments or technical features in different embodiments can also be combined, the steps may be implemented in any order, and there are many other variations of different aspects of the present disclosure as described above, which are not provided in the details for the sake of conciseness. Therefore, any omissions, modifications, equivalent substitutions, improvements etc. made within the spirit and principle of the present disclosure should be included in the protection scope of the present disclosure.

We claim:

1. An image enhancement method, comprising:
performing logarithm related processing on a grayscale value matrix Y of an original image to obtain a logarithmic matrix L_LOG;
quantizing the logarithmic matrix L_LOG to obtain a quantized matrix Y_RE; and
obtaining an enhanced image of the original image according to the quantized matrix Y_RE,
wherein quantizing the logarithmic matrix L_LOG comprises: when the logarithmic matrix L_LOG is quantized to be within a grayscale range of a certain depth, causing a zero point of the logarithmic matrix L_LOG to be close to an average value of the grayscale value matrix Y.

2. The method according to claim 1, wherein quantizing the logarithmic matrix L_LOG to be within a grayscale range of a certain depth comprises:
corresponding a range from a maximum value to a minimum value of the logarithmic matrix L_LOG to the depth of the grayscale range.

3. The method according to claim 2, wherein the logarithmic matrix L_LOG is quantized to be within a grayscale range of a certain depth according to the following equation:

$$Y\_RE(x, y) = \begin{cases} \frac{DEPTH - Y\_ave}{LOG\_MAX} \times L\_LOG(x, y) + Y\_ave, & L\_LOG > 0 \\ \frac{LOG\_MIN - L\_LOG(x, y)}{LOG\_MIN} \times Y\_ave & L\_LOG < 0 \end{cases}$$

wherein L_LOG(x,y) represents a logarithmic value of a grayscale of a pixel (x,y) of the original image in the logarithmic matrix L_LOG, Y_RE(x,y) represents a grayscale value of a grayscale of a pixel (x,y) in the quantized matrix Y_RE, DEPTH represents a depth of the grayscale range, Y_ave is an average value of the grayscale value matrix Y, and LOG_MAX and LOG_MIN represent a maximum value and a minimum value of the logarithmic matrix L_LOG respectively.

4. The method according to claim 3, wherein the maximum value and the minimum value of the logarithmic matrix L_LOG are calculated according to an average value and a standard deviation of the logarithmic matrix L_LOG.

5. The method according to claim 4, wherein the maximum value and the minimum value of the logarithmic matrix L_LOG are calculated according to the following equation:

LOG_MAX=MEAN+2*STD

LOG_MIN=MEAN−2*STD wherein MEAN and STD are an average value and a standard deviation of the logarithmic matrix L_LOG respectively.

6. The method according to claim 1, wherein performing logarithm related processing on a grayscale value matrix Y of an original image comprises:
performing logarithmic transformation on the grayscale value matrix Y to obtain a first logarithmic matrix Y_LOG;
performing logarithmic transformation on the grayscale value matrix Y after performing spatial filtering on the grayscale value matrix Y to obtain a second logarithmic matrix S_LOG; and
subtracting the second logarithmic matrix S_LOG from the first logarithmic matrix Y_LOG to obtain the logarithmic matrix L_LOG.

7. An image enhancement device, comprising:
a processor; and
a memory connected to the processor, and having instructions stored thereon, which when executed on the processor, causes the processor to be configured to:
perform logarithm related processing on a grayscale value matrix Y of an original image to obtain a logarithmic matrix L_LOG;
quantize the logarithmic matrix L_LOG to obtain a quantized matrix Y_RE; and
obtain an enhanced image of the original image according to the quantized matrix Y_RE,
wherein the processor is further configured to: when the logarithmic matrix L_LOG is quantized to be within a grayscale range of a certain depth, cause a zero point of the logarithmic matrix L_LOG to be close to an average value of the grayscale value matrix Y.

8. The device according to claim 7, wherein
the processor is further configured to correspond a range from a maximum value to a minimum value of the logarithmic matrix L_LOG to the depth of the grayscale range when the logarithmic matrix L_LOG is quantized to be within a grayscale range of a certain depth.

9. The device according to claim 8, wherein
the processor is further configured to quantize the logarithmic matrix L_LOG to be within a grayscale range of a certain depth according to the following equation:

$$Y\_RE(x, y) = \begin{cases} \frac{DEPTH - Y\_ave}{LOG\_MAX} \times L\_LOG(x, y) + Y\_ave, & L\_LOG \geq 0 \\ \frac{LOG\_MIN - L\_LOG(x, y)}{LOG\_MIN} \times Y\_ave & L\_LOG < 0 \end{cases}$$

wherein L_LOG(x,y) represents a logarithmic value of a grayscale of a pixel (x,y) of the original image in the logarithmic matrix L_LOG, Y_RE(x,y) represents a grayscale value of a grayscale of a pixel (x,y) in the quantized matrix Y_RE, DEPTH represents a depth of the grayscale range, Y_ave is an average value of the grayscale value matrix Y, and LOG_MAX and LOG- _MIN represent a maximum value and a minimum value of the logarithmic matrix L_LOG respectively.

10. The device according to claim 9, wherein the maximum value and the minimum value of the logarithmic matrix L_LOG are calculated according to an average value and a standard deviation of the logarithmic matrix L_LOG.

11. The device according to claim 10, wherein the maximum value and the minimum value of the logarithmic matrix L_LOG are calculated according to the following equation:

LOG_MAX=MEAN+2*STD

LOG_MIN=MEAN−2*STD wherein MEAN and STD are an average value and a standard deviation of the logarithmic matrix L_LOG respectively.

12. The device according to claim 7, wherein the processor is further configured to:
perform logarithm related processing on a grayscale value matrix Y of an original image comprises:
perform logarithmic transformation on the grayscale value matrix Y to obtain a first logarithmic matrix Y_LOG;
perform logarithmic transformation on the grayscale value matrix Y after performing spatial filtering on the grayscale value matrix Y to obtain a second logarithmic matrix S_LOG; and
subtract the second logarithmic matrix S_LOG from the first logarithmic matrix Y_LOG to obtain the logarithmic matrix L_LOG.

* * * * *